United States Patent
Heller et al.

(10) Patent No.: US 9,864,715 B2
(45) Date of Patent: Jan. 9, 2018

(54) BUS SYSTEM USING PLURALITY OF NON-OVERLAPPING FREQUENCY BANDS FOR COMMUNICATION

(75) Inventors: Christoph Heller, Taufkirchen (DE); Josef Schalk, Altheim (DE)

(73) Assignee: Airbus Defence and Space GmbH, Ottobrunn (DE)

(*) Notice: Subject to any disclaimer, the term of this patent is extended or adjusted under 35 U.S.C. 154(b) by 357 days.

(21) Appl. No.: 14/346,494

(22) PCT Filed: Sep. 12, 2012

(86) PCT No.: PCT/DE2012/100275
§ 371 (c)(1),
(2), (4) Date: Mar. 21, 2014

(87) PCT Pub. No.: WO2013/044908
PCT Pub. Date: Apr. 4, 2013

(65) Prior Publication Data
US 2014/0223067 A1    Aug. 7, 2014

(30) Foreign Application Priority Data

Sep. 29, 2011 (DE) .................. 10 2011 114 527

(51) Int. Cl.
*G06F 13/36* (2006.01)
*H04J 1/00* (2006.01)
(Continued)

(52) U.S. Cl.
CPC ...... *G06F 13/4004* (2013.01); *G06F 13/4068* (2013.01); *H04J 1/12* (2013.01);
(Continued)

(58) Field of Classification Search
CPC ....... H04L 12/2801; H04L 2025/03414; H04L 25/03343; H04L 27/362; H04L 5/06
(Continued)

(56) References Cited

U.S. PATENT DOCUMENTS

| 5,625,651 A | 4/1997 | Cioffi |
| 6,128,300 A | 10/2000 | Horton |

(Continued)

FOREIGN PATENT DOCUMENTS

| CN | 2248428 | 2/1997 |
| CN | 1922795 A | 2/2007 |

(Continued)

OTHER PUBLICATIONS

English translation of the International Preliminary Report on Patentability issued in PCT/DE2012/100275 dated Apr. 10, 2014.

(Continued)

*Primary Examiner* — Faisal M Zaman
(74) *Attorney, Agent, or Firm* — Hoffmann & Baron, LLP

(57) ABSTRACT

The invention relates to a bus system for transmitting data between data processing units in a network, by means of a bus that consists of two signal lines. The signals at said bus are analog signals which lie within a plurality of non-overlapping frequency bands assigned to the individual data processing units, and these data processing units use a digital communication protocol to communicate with a signal processor unit that comprises a polyphase filter bank, a D/A Converter and a bus-coupling unit being connected downstream of said bank in order to couple the data signal into the bus in a galvanically-isolated manner. The proposed bus system has a simple design with regard to cabling, allows the use of a Standard communication protocol such as Ethernet for the data processing units, and additionally allows data to be transmitted between all network subscribers simultaneously and without restriction.

16 Claims, 4 Drawing Sheets

(51) Int. Cl.
*G06F 13/40* (2006.01)
*H04J 1/12* (2006.01)
*H04L 25/02* (2006.01)
*H04L 12/40* (2006.01)

(52) U.S. Cl.
CPC .... *H04L 12/40032* (2013.01); *H04L 25/0266* (2013.01); *H04L 2012/4028* (2013.01); *H04L 2012/40215* (2013.01)

(58) Field of Classification Search
USPC .......................................... 710/306; 370/485
See application file for complete search history.

(56) References Cited

U.S. PATENT DOCUMENTS

| | | | | |
|---|---|---|---|---|
| 6,141,351 | A * | 10/2000 | Goodnow | H04Q 11/0478 370/449 |
| 6,289,487 | B1 * | 9/2001 | Hessel | H03G 3/345 714/795 |
| 6,665,308 | B1 * | 12/2003 | Rakib | H03M 13/256 348/E7.07 |
| 7,177,288 | B2 | 2/2007 | Mooney et al. | |
| 2003/0101306 | A1 * | 5/2003 | Mooney | H04L 5/1423 710/305 |
| 2003/0103589 | A1 * | 6/2003 | Nohara | H04B 1/713 375/350 |
| 2004/0201279 | A1 * | 10/2004 | Templeton | H02J 1/102 307/11 |
| 2005/0202842 | A1 | 9/2005 | Brobston et al. | |
| 2008/0191702 | A1 * | 8/2008 | Coenen | G01R 31/3662 324/434 |
| 2010/0088537 | A1 * | 4/2010 | Hua | H04L 12/4135 713/600 |
| 2010/0091825 | A1 * | 4/2010 | Cannon | H04L 1/0071 375/222 |
| 2010/0121511 | A1 * | 5/2010 | Onnerud | B60L 11/1851 701/22 |
| 2012/0162842 | A1 * | 6/2012 | Toth | H01M 8/04223 361/88 |
| 2013/0049853 | A1 * | 2/2013 | Selos | H04B 3/28 327/594 |

FOREIGN PATENT DOCUMENTS

| | | |
|---|---|---|
| DE | 10113878 A1 | 9/2002 |
| DE | 102009009663 A1 | 9/2010 |
| WO | 2011/111179 A1 | 9/2011 |

OTHER PUBLICATIONS

English translation of search report issued in Chinese Application No. 201280047566.9 dated Jul. 19, 2016.

* cited by examiner

BUS SYSTEM USING PLURALITY OF NON-OVERLAPPING FREQUENCY BANDS FOR COMMUNICATION

CROSS-REFERENCE TO RELATED APPLICATIONS

This application is a U.S. National Phase of International Application No. PCT/DE2012/100275 filed 12 Sep. 2012, which claims benefit of German Patent Application No. 10 2011 114 527.7 filed 29 Sep. 2011, the contents of which are incorporated herein by reference in their entirety.

BACKGROUND

The invention relates to a bus system for connecting a plurality of data processing units by means of a bus that consists of two signal lines.

Up to now, data processing unit processing systems are mainly coupled together by means of digital bus systems, wherein standardized protocols such as Ethernet (IEEE 802.3) are being used, based upon which network protocols such as TCP/IP or similar are being utilized. Ethernet connections with data transfer rates of 100 Mbit/s are presently widely in use because of the high data transfer rate, the low costs and the sturdiness of the system. A disadvantageous fact is that two separate pairs of wires are required for the data transmission and reception, which doubles the weight of the lines compared to other protocols such as ARINC-429 or MIL-STD-1553 or CAN, which require only one pair of wires. Another substantial disadvantage consists in that only point-to-point connections are possible and that active couplers such as hubs or switches are required to build up a network with multiple participants. If the Ethernet is to be operated in a deterministic manner with guaranteed bandwidths and/or guaranteed maximum delays, this requires complex protocols for controlling the media access (so-called MAC protocols). These are based either on the TDMA principle (time division multiple access) or require complex, priority-ontrolled buffer and transmission rate restriction concepts.

SUMMARY

Against this background, the purpose of the invention is to provide a bus system for connecting a plurality of data processing units, the design of which is simple regarding the cabling, which can operate with a customary protocol with respect to the physical layer, which however facilitates a concurrent and unrestricted data transfer between all network subscribers.

The invention results from the features of the independent claim. Advantageous developments and designs are subject of the dependent claims. Additional features, possible applications and advantages result from the following description, as well as from the explanation of embodiments of the invention, which are represented in the figures.

This problem is solved in that analog signals are applied on the bus which lie within multiple non-overlapping frequency bands, wherein a frequency band with a mid-frequency is assigned to each data processing unit;

each data processing unit is coupled with the bus by means of a modem unit, which comprises the following components:

an interface unit that can be connected with the data processing unit and communicates with it by means of a digital communication protocol (e.g. IEEE 802.3);

a narrowband modulation unit that converts the user data flow into a signal which can be transferred by means of the frequency bands;

a filter bank synthesis unit which as a polyphase filter bank converts the data of the interface unit on the mid-frequency assigned to the data processing unit and suppresses interferences between adjacent frequency bands;

a D/A converter, which converts the signal of the filter bank synthesis unit into an analog signal;

a bus-coupling unit, in order to couple the signal of the D/A converter to be transmitted into the bus and to decouple received signals of the bus;

an A/D converter, which digitizes the bus signals received from the bus-coupling unit;

a filter bank analysis unit, which as a polyphase filter bank partitions the digitized bus signals into the individual frequency bands and feeds the data assigned to the individual frequency bands to the interface unit; and a narrowband demodulation unit, which demodulates the data stream of the filter bank analysis unit and feeds the user data to the interface unit.

The invention is characterized in that the digital data processing technologies for partitioning the network into multiple virtual and independent connections are used in the frequency domain. Signals can be transmitted on any of the virtual connections without being influenced by the transmissions between other connections. In this context, the network technology can be a simple passive bus construction which consists of one twisted pair of wires without active components between the components, i.e. the data processing unit. In this context, both direct point-to-point connections (PP) as well as point-to-multipoint connections can be realized in that different non-overlapping frequency bands are assigned for the transmission of each node. Data processing units are understood to be all types of equipment performing data exchange with each other, such as computers, actuators, sensors, controllers, etc.

For this purpose, the physical layer is realized as efficiently as possible to minimize hardware costs. On the upper level, this is compatible to a customary protocol, in particular the fast Ethernet protocol, to permit simple system migration. As a physical layer, the solution as taught by the invention is based upon galvanically-isolated network interfaces, so that it can also be used with carbon fiber reinforced plastic structures (CFRP) of modern aircraft.

In this context, the frequency division multiple access method (FDMA) is based upon the concurrent transmission of multiple narrowband signals on different frequencies in a twisted pair cable. For this purpose, the available bandwidth of the twisted-pair cable is divided into a set of independent, non-overlapping frequency bands, which transmit the individual data streams. With a typical type of cable (WX 26) that is used for CAN bus systems in aeronautical engineering, this will result in a bandwidth of approximately 10 MHz for a cable length of 60 m with a −3 dB signal attenuation, for example. Shorter cables have significantly higher −3 dB bandwidths. This bandwidth (i.e. 10 MHz in the preferred example) is partitioned into a set of preferably 8 subbands, preferably with a uniform 1.25 MHz center distance.

The data from each data processing unit are fed into a polyphase filter bank, which comprises a Fast-Fourier-Transformation unit (FFT) as well as a lowpass filter. The polyphase filter bank consists of a synthesis filter bank, which comprises the transmission functionality as well as an analysis filter bank for the receiver functionality. The data processing is accomplished with a sampling frequency of 20 MHz, so that signals up to a cable bandwidth of 10 MHz can be processed. A 32-point IFFT/FFT is performed, which would partition the 20 MHz into 32 bands, wherein the upper 16 are not used and only every second one is used from the lower 16 bands, in order to increase the distance between the used bands and therefore minimize interferences.

According to an advantageous development of the invention, a first analog low-pass filter is arranged between the D/A converter and the bus-coupling unit. This reduces electromagnetic emissions of the bus system to adjacent systems.

According to an advantageous development of the invention, a second analog low-pass filter is arranged between the bus-coupling unit and the A/D converter. This band-imits the received signal such that no alias effects are created by the chronological sampling of the A/D converter.

According to an advantageous development of the invention, a driver unit is connected upstream on the transmission side of the bus-coupling unit, in order to couple a sufficiently strong signal inductively or capacitively into the bus.

According to an advantageous development of the invention, the data encoding in the narrowband modulation unit is accomplished by means of quadrature amplitude modulation, so that multiple data bits can be transmitted with each transferred symbol.

According to an advantageous development of the invention, the digital communication protocol is IEEE 802.3 (Ethernet), ARINC-429, MIL-STD-1553 or CAN. The system as taught by the invention can be coupled with traditional data processing units by means of these customary protocols, the interfaces of which operate according to one of these protocols.

According to an advantageous development of the invention, eight frequency bands with mid-frequencies of n*0.625 MHz (n=1 . . . 7) are provided. This is particularly advantageous when cables of the type WX 26 are being used to connect eight different data processing units to each other.

According to an advantageous development of the invention, the galvanic coupling in the bus-coupling unit is performed inductively. This is simple from a structural point of view and permits high transmission efficiency.

Further advantages, features and particulars result from the following description, which describes particulars of at least one embodiment in detail, if necessary by reference to the drawings. Features that are described and/or illustrated form the subject of the invention either on their own or in any optional meaningful combination. Identical, similar and/or parts which have the same function, are provided with the same reference symbols.

DETAILED DESCRIPTION

Figure 1:
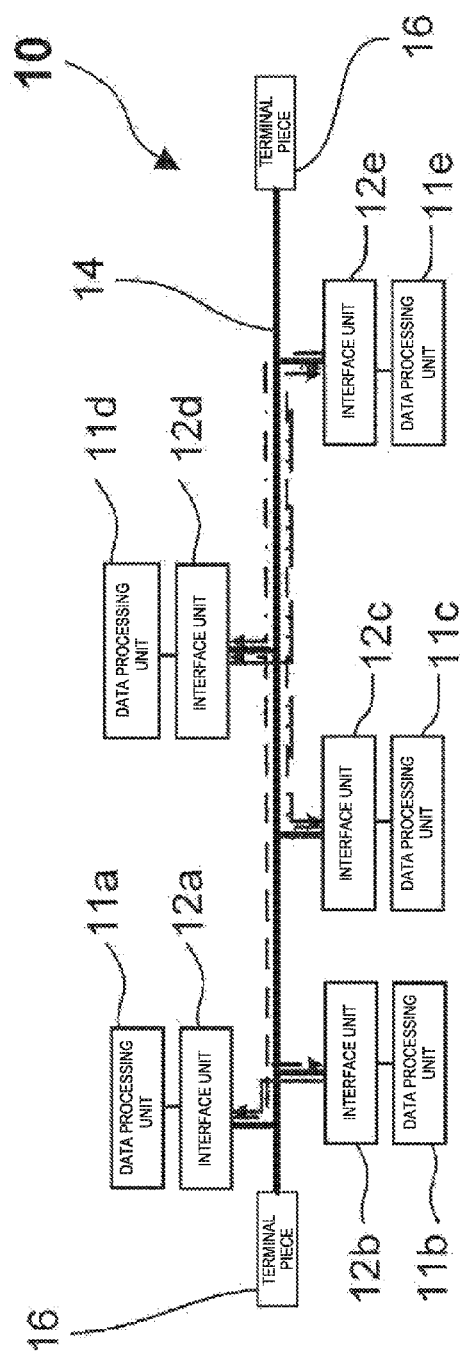
FIG. 1 is a schematic illustration of the network according to the invention.

FIG. 1 illustrates a schematic network representation of the bus system 10 according to the invention, which consists of several data processing units 11a-11e, which are connected to a two-wire bus 14 by means of interface units 12a-12e. The bus 14 is terminated on both ends by terminal pieces 16 with the characteristic cable impedance. The data traffic on the bus 14 between the individual interface units 12a-12e is represented by different gray shading effects.

Figure 2:
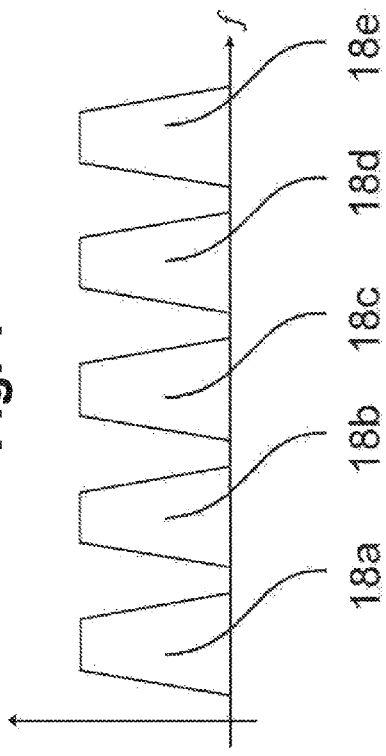
FIG. 2 is a schematic illustration of the frequency domain of the data traffic according to FIG. 1.

FIG. 2 illustrates the data traffic on the bus 14 in the frequency domain, wherein it is noticeable that the communication in each case occurs between different nodes in different frequency bands 18a-18e. Thus, the communication between the nodes 12c and 12d for example occurs in frequency band 18a, between the nodes 12a and 12b in frequency band 18b, and so on.

Figure 3:
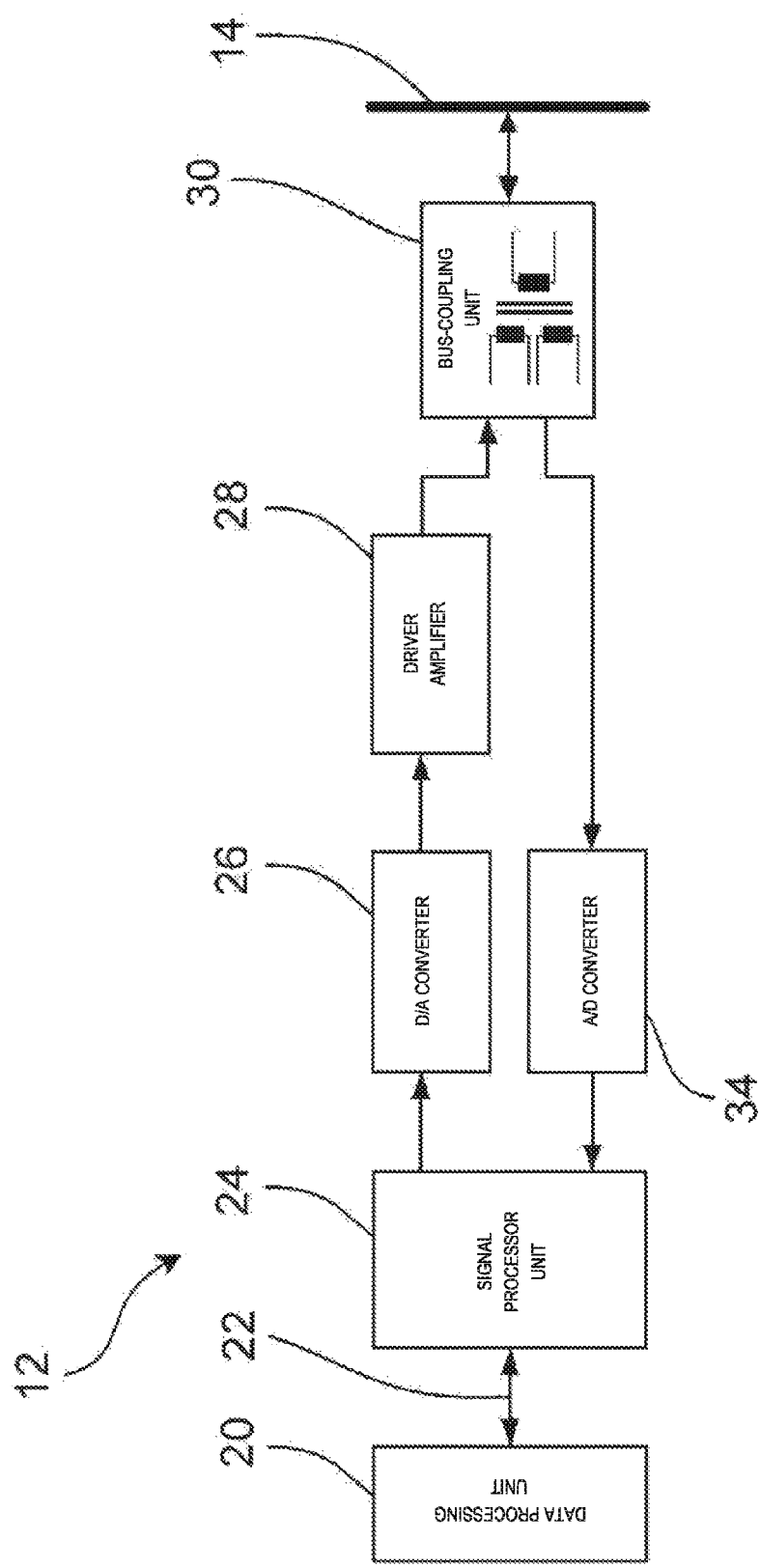
FIG. 3 is a block wiring diagram of the components within a node.

FIG. 3 is a block wiring diagram of the components present in an interface unit 12. A data processing unit 20 is connected by means of a digital connection 22, preferably pursuant to the Ethernet protocol, with a signal processor unit 24, which is preferably performed as a so-called FPGA (Field Programmable Gate Array), in which all digital signal processing steps for the narrowband transmission and reception as well as the channelization occur by utilization of the polyphase filter bank. The transmission signal of the signal processor unit 24 is fed to a D/A converter 26, which converts the digital signal into an analog signal. During the sturdy narrowband transmission, the D/A converter 26 can have a resolution from 8 to 10 bit. A driver amplifier 28 amplifies the signal to be transmitted and feeds it to a bus-coupling unit 30, which is coupled inductively with the bus 14. The coupling can alternatively also occur capacitively. A single analog low-pass filter (not shown) can be provided between D/A converter 26 and driver amplifier 28, as well as between bus-coupling unit 30 and A/D converter 34, to prevent aliasing effects and to smoothen the signal. The galvanic isolation by the bus-coupling unit 30 is important to achieve sturdiness against lightning strikes and to make the system suitable for the installation in aircraft made of fiber-reinforced polymers (CFRP).

In the receive leg, the signal from the bus 14 is fed by means of an A/D converter 34 to the signal processor unit 24, which performs the signal processing in reverse for the transmission leg.

Figure 4:
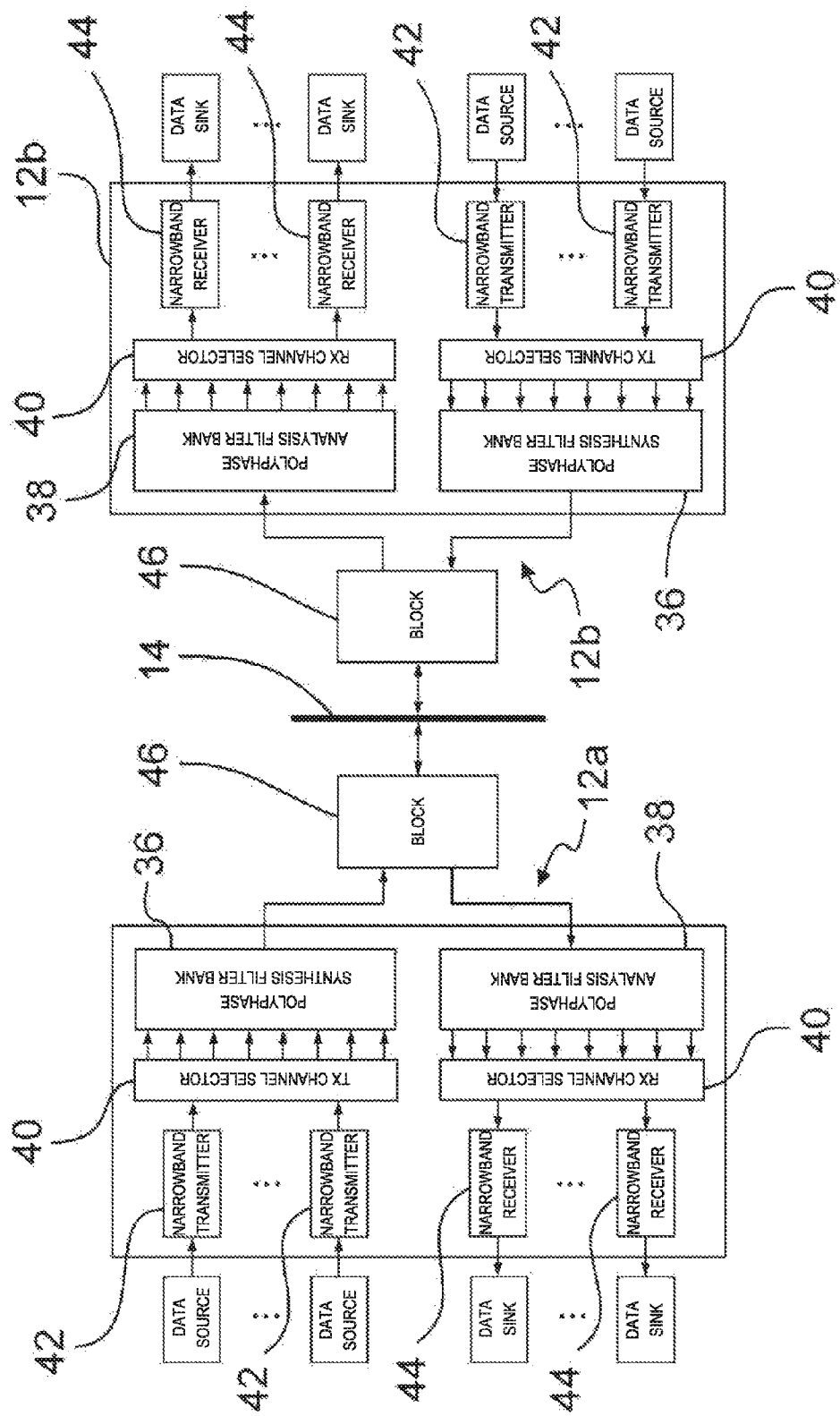
FIG. 4 is the system for an arrangement with two nodes.

FIG. 4 illustrates the system for an arrangement with two interface units 12a, 12b in detail. Each interface unit comprises a synthesis filter bank 36 for data transmission and an analysis filter bank 38 for data reception. Both filter banks comprise a polyphase architecture. For each interface unit, a channel selection block 40 selects the frequency domain channel on which transmission occurs as well as is the subchannel on which data are received. Multiple channels can be assigned to an interface unit (a node) for both directions. To prevent collisions in the network, only one node should be assigned to each channel as a transmission channel, while multiple nodes can receive data from the same channel. This system facilitates the setup of point-to-multipoint channels for the ARINC-429 or the AFDX protocol. Narrowband transmitters 42 and narrowband receivers 44 operate preferably according to the non-return-to-zero (NRZ) coding with a sampling frequency of 20 MHz/32=625 kHz. By means of the NRZ coding, it is possible to achieve a bit rate of 625 Kbit/s on each subchannel, or a total data rate of 8×625 Kbit/s, i.e. 5 Mb/s. With NRZ coding, it is not possible to transmit the entire bandwidth of the NRZ signal, however the bandwidth that can be transmitted is sufficient to decode the signal. The units in FIG. 3 marked with the reference symbols 24, 26, 28, 30, 34 are integrated in the blocks 46 of FIG. 4.

Alternatively, another coding can be used, for instance particularly quadrature amplitude modulation (QAM), which has the advantage that multiple data bits can be transmitted per symbol. The use of a 16-QAM, which transmits 4 data bits per symbol would be advantageous, because with this an IEEE 802.3 media independent interface data block (MII) can be transmitted per symbol.

Figure 5:
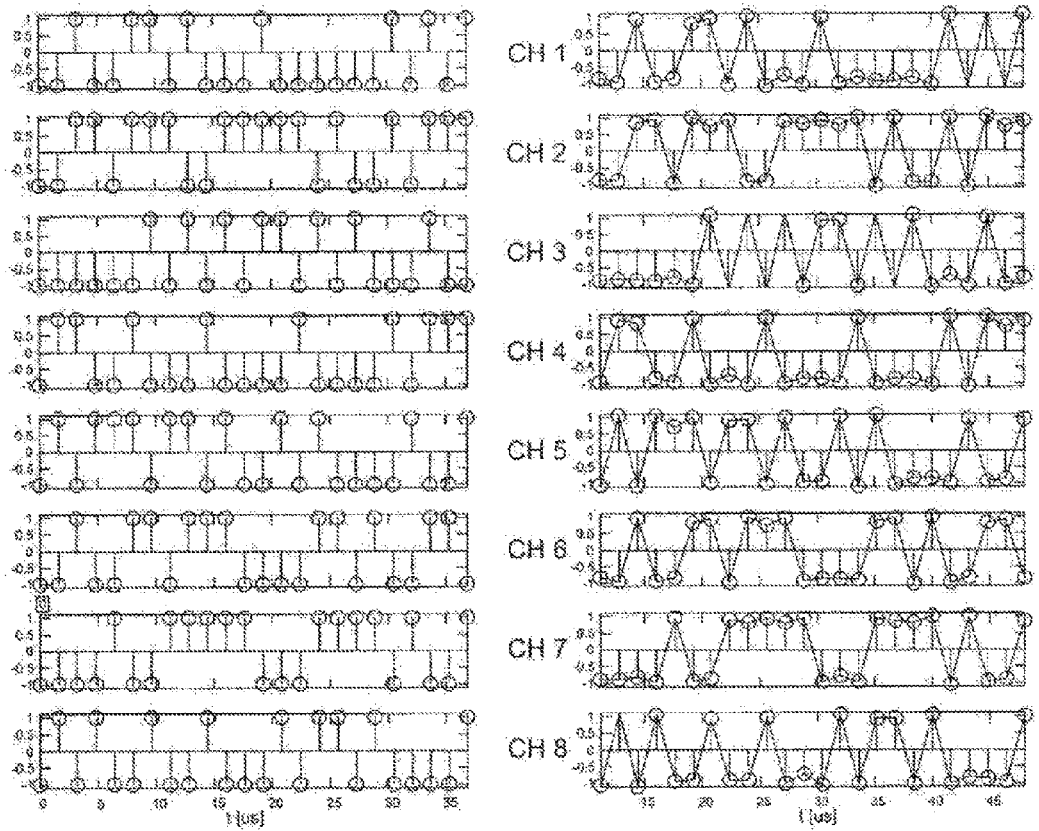
FIG. 5 are the signals from eight independent NRZ data streams.

FIG. 5 represents the signals of eight independent NRZ data streams, which were transmitted from one node and received by another node. The signals on the transmission side are presented on the left, and the signals on the receiving side are presented on the right, for the eight channels for random bit sequences. It is obvious that the data streams do not interfere reciprocally and can be decoded correctly by the receiver. In this context, it is evident that following a threshold decision, all bit values arrive correctly and that merely a delay of eight samplings occurs as well as a minor amplitude distortion, due to intersymbol interferences, because the bandwidth of the subchannels is slightly smaller than the bandwidth of the NRZ data stream.

Figure 6:
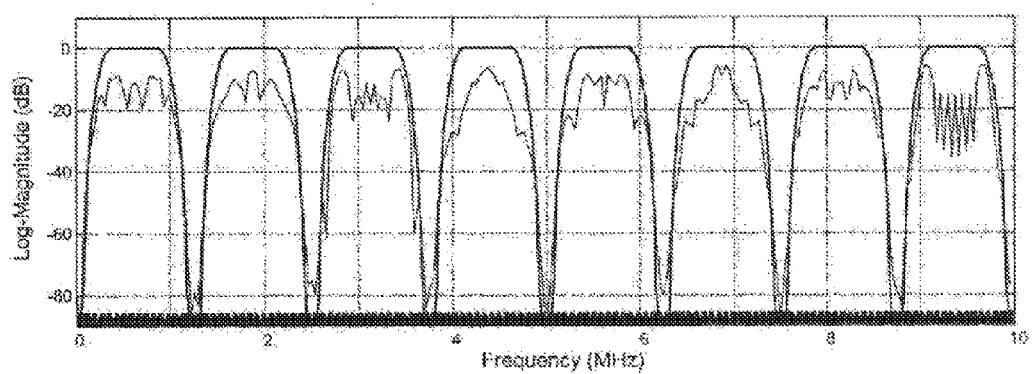
FIG. 6 is the overall spectrum during the transmission of 8 data streams

FIG. 6 represents the analog signal spectrum at a data rate of 625 Kb/s on each subchannel together with the filter bank characteristics in the frequency domain spectrum. To this end, it is evident that this consists of eight lower band signals, which correspond perfectly to the filter bank characteristics.

LIST OF REFERENCE SYMBOLS

10 Bus system
11 Data processing unit
12 Interface unit
14 Bus
16 Terminal piece
18 Frequency band
20 Data processing unit
22 Connection
24 Signal processor unit
26 D/A converter
28 Driver amplifier
30 Bus-coupling unit
34 A/D converter
36 Synthesis filter bank
38 Analysis filter bank
40 Channel selection block
42 Narrowband transmitter
44 Narrowband receiver
46 Block

The invention claimed is:
1. A bus system associated with a network partitioned into multiple virtual connections, the bus system comprising:
  a bus having two signal lines with analog signals applied on the bus within non-overlapping frequency bands;
  a plurality of data processing units, each of the data processing units assigned with a distinct non-overlapping mid-frequency band, the bus connecting the data processing units to the network using direct point-to-point or point-to-multipoint virtual connections based at least on one distinct non-overlapping mid-frequency band; and
  a modem unit coupling each data processing unit with the bus using the two signal lines of the bus, the modem unit comprising:
    an interface unit connectable with each data processing unit to communicate using the direct point-to-point or point-to-multipoint virtual connections with each data processing unit using a digital communication protocol;
    a modulation unit that converts flow of data into a signal that is transferable using the non-overlapping frequency bands;
    a filter bank synthesis unit comprising a polyphase filter bank that converts the data of the interface unit on the distinct mid-frequency band assigned to the data processing unit and suppresses interferences between adjacent non-overlapping frequency bands;
    a D/A converter that converts the signal of the filter bank synthesis unit into an analog signal;
    a bus-coupling unit configured to inductively or capacitively couple the analog signal of the D/A converter that is transmitted onto the bus in a galvanically isolated manner, and to inductively or capacitively decouple one or more analog signals received from the bus in a galvanically isolated manner;
    an A/D converter that digitizes the analog signals received from the bus-coupling unit;
    a filter bank analysis unit comprising a polyphase filter bank that partitions the digitized signals into the distinct non-overlapping frequency bands, and feeds data to the interface unit based on its assigned non-overlapping frequency band; and
    a demodulation unit that demodulates the data of the filter bank analysis unit, and feeds user data to the interface unit, wherein the bus system transmits data using the direct point-to-point or point-to-multipoint virtual connections while minimizing interference between the multiple virtual connections, wherein only every second frequency band of the non-overlapping frequency bands is utilized exclusively.

2. The bus system according to claim 1, wherein $2^n$ (n=1 to 6) frequency bands are provided.

3. The bus system according to claim 1, wherein a first analog low-pass filter is arranged between the D/A converter and the bus-coupling unit.

4. The bus system according to claim 1, wherein a second analog low-pass filter is arranged between the A/D converter and the bus-coupling unit.

5. The bus system according to claim 1, wherein on a transmission side of the bus-coupling unit, a driver unit is arranged upstream.

6. The bus system according to claim 1, wherein data encoding in the modulation unit is performed using quadrature amplitude modulation.

7. The bus system according to claim 1, wherein the digital communication protocol is IEEE 802.3 (Ethernet), ARINC-429, MIL-STD-1553 or CAN.

8. The bus system according to claim 1, wherein 8 frequency bands with mid-frequencies of n*0.625 MHz (n=1 . . . 7) are provided.

9. An aircraft comprising a bus system associated with a network partitioned into multiple virtual connections, the bus system comprising:
  a bus having two signal lines with analog signals applied on the bus within non-overlapping frequency bands;
  a plurality of data processing units, each of the data processing units assigned with a distinct non-overlapping mid-frequency band, the bus connecting the data processing units to the network using direct point-to-point or point-to-multipoint virtual connections based at least on one distinct non-overlapping mid-frequency band; and a modem unit coupling each data processing unit with the bus using the two signal lines of the bus, the modem unit comprising:

an interface unit connectable with each data processing unit to communicate using the direct point-to-point or point-to-multipoint virtual connections with each data processing unit using a digital communication protocol;

a modulation unit that converts flow of data into a signal that is transferable using the non-overlapping frequency bands;

a filter bank synthesis unit comprising a polyphase filter bank that converts the data of the interface unit on the distinct mid-frequency band assigned to the data processing unit and suppresses interferences between adjacent non-overlapping frequency bands;

a D/A converter that converts the signal of the filter bank synthesis unit into an analog signal;

a bus-coupling unit configured to inductively or capacitively couple the analog signal of the D/A converter that is transmitted onto the bus in a galvanically isolated manner, and to inductively or capacitively decouple one or more analog signals received from the bus in a galvanically isolated manner;

an A/D converter that digitizes the analog signals from the bus-coupling unit;

a filter bank analysis unit comprising a polyphase filter bank that partitions the digitized signals into the distinct non-overlapping frequency bands, and feeds data to the interface unit based on its assigned non-overlapping frequency band; and a demodulation unit that demodulates the data of the filter bank analysis unit, and feeds user data to the interface unit, wherein the bus system transmits data using the direct point-to-point or point-to-multipoint virtual connections while minimizing interference between the multiple virtual connections, wherein only every second frequency band of the non-overlapping frequency bands is utilized exclusively.

10. The aircraft according to claim 9, wherein $2^n$ (n=1 to 6) frequency bands are provided.

11. The aircraft according to claim 9, wherein a first analog low-pass filter is arranged between the D/A converter and the bus-coupling unit.

12. The aircraft according to claim 9, wherein a second analog low-pass filter is arranged between the A/D converter and the bus-coupling unit.

13. The aircraft according to claim 9, wherein on a transmission side of the bus-coupling unit, a driver unit is arranged upstream.

14. The aircraft according to claim 9, wherein data encoding in the narrowband modulation unit is performed using quadrature amplitude modulation.

15. The aircraft according to claim 9, wherein the digital communication protocol is IEEE 802.3 (Ethernet), ARINC-429, MIL-STD-1553 or CAN.

16. The aircraft according to claim 9, wherein 8 frequency bands with mid-frequencies of n*0.625 MHz (n=1.7) are provided.

* * * * *